(12) United States Patent
Park et al.

(10) Patent No.: US 12,192,901 B2
(45) Date of Patent: Jan. 7, 2025

(54) METHOD FOR TRANSMITTING AND RECEIVING SIGNAL IN WIRELESS COMMUNICATION SYSTEM

(71) Applicant: LG Electronics Inc., Seoul (KR)

(72) Inventors: Giwon Park, Seoul (KR); Seoyoung Back, Seoul (KR); Jongyoul Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 382 days.

(21) Appl. No.: 17/783,165

(22) PCT Filed: Jan. 11, 2021

(86) PCT No.: PCT/KR2021/000359
§ 371 (c)(1),
(2) Date: Jun. 7, 2022

(87) PCT Pub. No.: WO2021/141476
PCT Pub. Date: Jul. 15, 2021

(65) Prior Publication Data
US 2023/0024646 A1 Jan. 26, 2023

(30) Foreign Application Priority Data
Jan. 9, 2020 (KR) ........................ 10-2020-0003075

(51) Int. Cl.
H04W 52/02 (2009.01)
H04W 72/20 (2023.01)
H04W 76/28 (2018.01)

(52) U.S. Cl.
CPC ....... *H04W 52/0232* (2013.01); *H04W 72/20* (2023.01); *H04W 76/28* (2018.02)

(58) Field of Classification Search
CPC .. H04W 52/0232; H04W 72/20; H04W 76/28
See application file for complete search history.

(56) References Cited

U.S. PATENT DOCUMENTS

| 2019/0053305 | A1 | 2/2019 | Saiwai et al. | |
| 2022/0109970 | A1* | 4/2022 | Jeong | H04W 72/02 |
| 2022/0295407 | A1* | 9/2022 | Hosseini | H04W 52/0235 |

FOREIGN PATENT DOCUMENTS

WO 2017078783 A1 5/2017

OTHER PUBLICATIONS

R2-1916120: 3GP TSG-RAN WG2 Meeting #108, Reno, USA, Nov. 18-22, 2019, LG Electronics Inc., 'Introduction of 5G VsX with NR Sidelink. (34 Pages).

(Continued)

*Primary Examiner* — Erika A Washington
(74) *Attorney, Agent, or Firm* — BRYAN CAVE LEIGHTON PAISNER LLP

(57) ABSTRACT

One embodiment provides a method for performing an operation for a first terminal in a wireless communication system, wherein: in an on-duration period, a physical sidelink control channel (PSCCH) including first sidelink control information (SCI) is monitored; on the basis of reception of at least one sidelink traffic indication indicating that there is sidelink data to be transmitted from a second terminal, a physical sidelink shared channel (PSSCH) including second SCI is monitored; and on the basis of non-reception of at least one sidelink traffic indication indicating that there is sidelink data to be transmitted from the second terminal, the PSSCH including the second SCI is not monitored. The first UE communicates with at least one of another UE, a UE related to an autonomous driving vehicle, or a base station (BS), or a network.

11 Claims, 19 Drawing Sheets

(56) References Cited

OTHER PUBLICATIONS

3GPP TS 36.321: 3rd Generation Partnership Project; Technical Specification Group Radio Access Network, E-UTRA; Mac protocol specification (Release 15). (Dec. 2019); 3GPP TS 36.321 V15.8.0; Valbonne-France, (134 Pages).
RP-192296: 3GPP TSG RAN Meeting #85, Newport Beach, USA, Sep. 16-20, 2019, LG Electronics, OPPO,'Summary of email discussion on sidelink enhancements in Rel-187, (82 Pages).

* cited by examiner

METHOD FOR TRANSMITTING AND RECEIVING SIGNAL IN WIRELESS COMMUNICATION SYSTEM

This application is the National Stage filing under 35 U.S.C. 371 of International Application No. PCT/KR2021/000359 filed on Jan. 11, 2021, which claims priority to Korean Patent Application No. 10-2020-0003075 filed on Jan. 9, 2020, the contents of which are all hereby incorporated by reference herein in their entirety.

TECHNICAL FIELD

The following description relates to a wireless communication system, and more particularly to power saving of a user equipment (UE) operating in discontinuous reception (DRX).

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and multi carrier frequency division multiple access (MC-FDMA) system, etc.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs.

Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

An object to be achieved with embodiment(s) is to perform additional power saving in an on-duration section of a user equipment (UE) operating in discontinuous reception (DRX).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment, a method of performing an operation for a first user equipment (UE) in a wireless communication system includes monitoring a physical sidelink control channel (PSCCH) including first sidelink control information (SCI) in an on-duration section, based on that at least one sidelink traffic indication about that there is sidelink data to be transmitted from a second UE is received, monitoring a physical sidelink shared channel (PSSCH) including second SCI, and based on that the at least one sidelink traffic indication about that there is the sidelink data to be transmitted from the second UE is not received, skipping monitoring of the PSSCH including the second SCI.

According to an embodiment, a first user equipment (UE) in a wireless communication system includes at least one processor, and at least one computer memory operatively connected to the at least one processor and configured to store commands that when executed causes the at least one processor to perform operations, wherein the operations include monitoring a physical sidelink control channel (PSCCH) including first sidelink control information (SCI) in an on-duration section, based on that at least one sidelink traffic indication about that there is sidelink data to be transmitted from a second UE is received, monitoring a physical sidelink shared channel (PSSCH) including second SCI, and based on that the at least one sidelink traffic indication about that there is the sidelink data to be transmitted from the second UE is not received, skipping monitoring of the PSSCH including the second SCI.

An embodiment provides a computer readable storage medium storing at least one computer program that includes a command that, when executed by at least one processor, causes the at least one processor to perform operations for a first user equipment (UE), the operations including monitoring a physical sidelink control channel (PSCCH) including first sidelink control information (SCI) in an on-duration section, based on that at least one sidelink traffic indication about that there is sidelink data to be transmitted from a second UE is received, monitoring a physical sidelink shared channel (PSSCH) including second SCI, and based on that the at least one sidelink traffic indication about that there is the sidelink data to be transmitted from the second UE is not received, skipping monitoring of the PSSCH including the second SCI.

The first UE may determine whether the second SCI is for the first UE based on the second SCI is determined.

Based on that a source L1 identifier included in the second SCI is the same as a unicast destination L1 identifier of the first UE or a destination L1 identifier included in the second SCI is the same as a unicast source L1 identifier of the first UE, the first UE may determine that the second SCI is for the first UE.

Based on that a groupcast/broadcast destination L1 identifier included in the second SCI is the same as a groupcast/broadcast destination L1 identifier of the first UE, the first UE may determine that the second SCI is for the first UE.

The sidelink traffic indication about that there is the sidelink data to be transmitted from the second UE may not be received, and based on that there is no sidelink data to be transmitted to the second UE, the first UE may operate in a sleep mode before the on-duration section ends.

Based on the first SCI and the second SCI, the first UE may receive a PSSCH including the sidelink data.

The first UE may operate a sidelink discontinuous reception (DRX) on-duration timer in the on-duration section.

Advantageous Effects

According to an embodiment, a first user equipment (UE) operating in discontinuous reception (DRX) may not monitor a physical sidelink shared channel (PSSCH) during an on-duration section when there is no sidelink data to be received from a neighboring UE, thereby acquiring an additional power saving effect.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure.

BEST MODE

Figure 1:
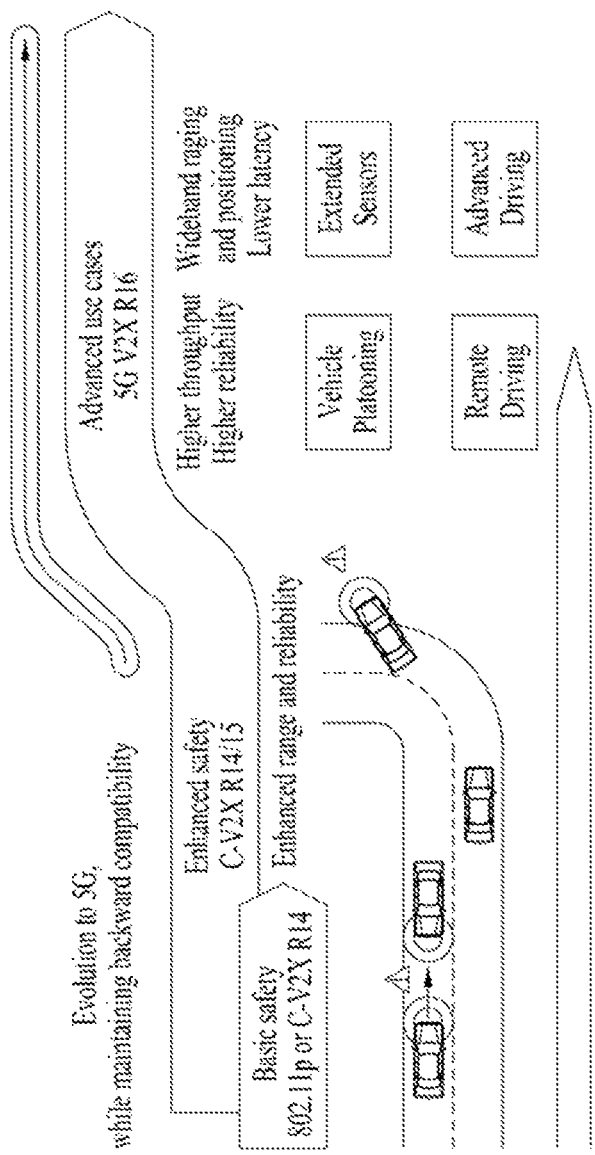
FIG. 1 is a diagram illustrating vehicle-to-everything (V2X) communication based on pre-new radio access technology (NR) RAT and V2X communication based on NR in comparison.

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). $3^{rd}$ generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

SCI (Sidelink Control Information) will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or An SL CSI-RS transmission indicator or information about the number of SL CSI-RS antenna ports (to be transmitted);

Location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Figure 2:
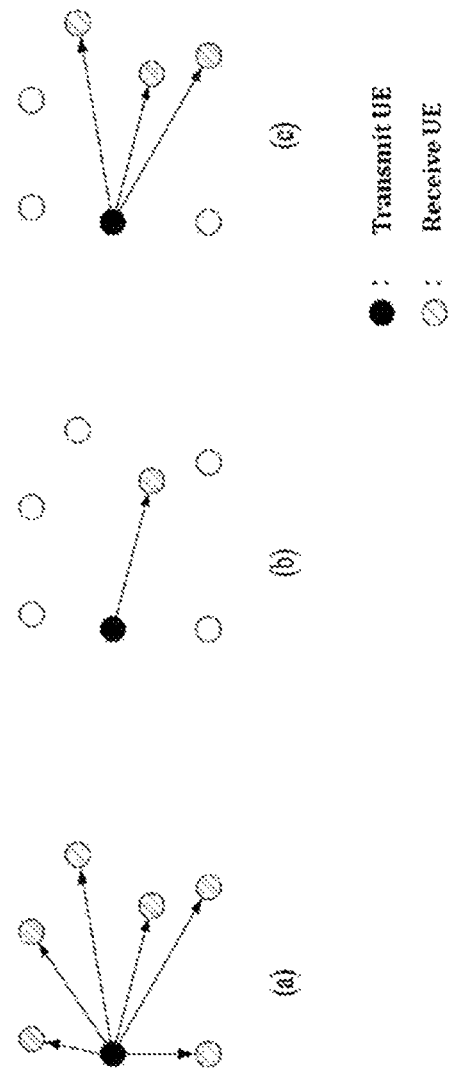
FIG. 2 illustrates three cast types according to an embodiment of the present disclosure.

FIG. 2 illustrates three cast types according to an embodiment of the present disclosure.

Specifically, FIG. 2(a) illustrates broadcast-type SL communication, FIG. 2(b) illustrates unicast-type SL communication, and FIG. 2(c) illustrates groupcast-type SL communication. In unicast-type SL communication, a UE may perform one-to-one communication with another UE. In groupcast-type SL communication, the UE may perform SL communication with one or more UEs of a group to which the UE belongs. In various embodiments of the present disclosure, SL groupcast communication may be replaced with SL multicast communication, SL one-to-many communication, and so on.

PHY-layer processing will be described below.

According to an embodiment of the present disclosure, a data unit may be subjected to PHY-layer processing at a transmitting side before being transmitted over an air interface. According to an embodiment of the present disclosure, a radio signal carrying a data unit may be subjected to PHY-layer processing at a receiving side.

Figure 3:
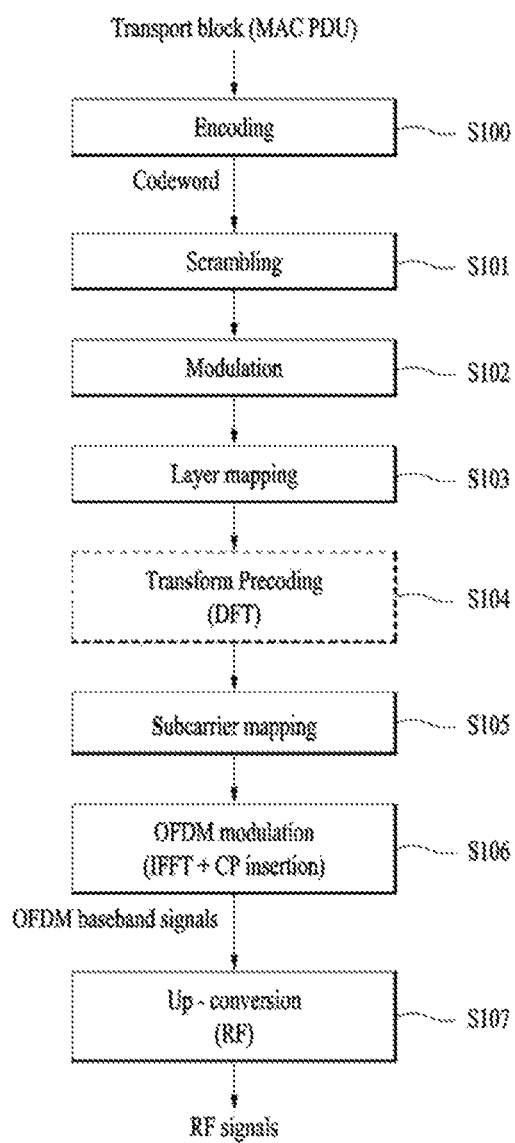
FIG. 3 is a diagram illustrating physical (PHY)-layer processing at a transmitting side according to an embodiment of the present disclosure.

FIG. 3 is a diagram illustrating physical (PHY-)layer processing at a transmitting side according to an embodiment of the present disclosure.

Table 1 may illustrate a mapping relationship between UL transport channels and physical channels, and Table 2 may illustrate a mapping relationship between UL control channel information and physical channels.

TABLE 1

| Transport channel | Physical channel |
|---|---|
| UL-SCH (UL-Shared Channel) | PUSCH (Physical UL Shared Channel) |
| RACH (Random Access Channel) | PRACH (Physical Random Access Channel) |

TABLE 2

| Control information | Physical channel |
|---|---|
| UCI (UL Control Information) | PUCCH (Physical UL Control Channel) |
| | PUSCH (Physical UL Shared Channel) |

Table 3 may illustrate a mapping relationship between DL transport channels and physical channels, and Table 4 may illustrate a mapping relationship between DL control channel information and physical channels.

TABLE 3

| Transport channel | Physical channel |
|---|---|
| DL-SCH (DL-Shared Channel) | PDSCH (Physical DL Shared Channel) |
| BCH (Broadcast Channel) | PBCH (Physical Broadcast Channel) |
| PCH (Paging Channel) | PDSCH (Physical DL Shared Channel) |

TABLE 4

| Control information | Physical channel |
|---|---|
| DCI (DL Control Information) | PDCCH (Physical DL Control Channel) |

Table 5 may illustrate a mapping relationship between SL transport channels and physical channels, and Table 6 may illustrate a mapping relationship between SL control channel information and physical channels.

TABLE 5

| Transport channel | Physical channel |
|---|---|
| SL-SCH (Sidelink-Shared Channel) | PSSCH (Physical Sidelink Shared Channel) |

TABLE 5-continued

| Transport channel | Physical channel |
|---|---|
| SL-BCH (Sidelink-Broadcast Channel) | PSBCH (Physical Sidelink Broadcast Channel) |

TABLE 6

| Control information | Physical Channel |
|---|---|
| 1st-stage SCI | PSCCH |
| 2nd-stage SCI | PSSCH |
| SFCI | PSFCH |

Referring to FIG. 3, a transmitting side may encode a TB in step S100. The PHY layer may encode data and a control stream from the MAC layer to provide transport and control services via a radio transmission link in the PHY layer. For example, a TB from the MAC layer may be encoded to a codeword at the transmitting side. A channel coding scheme may be a combination of error detection, error correction, rate matching, interleaving, and control information or a transport channel demapped from a physical channel. Alternatively, a channel coding scheme may be a combination of error detection, error correcting, rate matching, interleaving, and control information or a transport channel mapped to a physical channel.

In the NR system, the following channel coding schemes may be used for different types of transport channels and different types of control information. For example, channel coding schemes for respective transport channel types may be listed as in Table 7. For example, channel coding schemes for respective control information types may be listed as in Table 8.

TABLE 7

| Transport channel | Channel coding scheme |
|---|---|
| UL-SCH | LDPC (Low Density Parity Check) |
| DL-SCH | |
| SL-SCH | |
| PCH | |
| BCH | Polar code |
| SL-BCH | |

TABLE 8

| Control information | Channel coding scheme |
|---|---|
| DCI | Polar code |
| SCI | |
| UCI | Block code, Polar code |

For example, a polar code may be applied to the PSCCH. For example, an LDPC code may be applied to a TB transmitted on the PSSCH.

For transmission of a TB (e.g., a MAC PDU), the transmitting side may attach a CRC sequence to the TB. Thus, the transmitting side may provide error detection for the receiving side. In SL communication, the transmitting side may be a transmitting UE, and the receiving side may be a receiving UE. In the NR system, a communication device may use an LDPC code to encode/decode a UL-SCH and a DL-SCH. The NR system may support two LDPC base graphs (i.e., two LDPC base metrics). The two LDPC base graphs may be LDPC base graph 1 optimized for a small TB and LDPC base graph 2 optimized for a large TB. The transmitting side may select LDPC base graph 1 or LDPC base graph 2 based on the size and coding rate R of a TB. The coding rate may be indicated by an MCS index, I_MCS. The MCS index may be dynamically provided to the UE by a PDCCH that schedules a PUSCH or PDSCH. Alternatively, the MCS index may be dynamically provided to the UE by a PDCCH that (re)initializes or activates UL configured grant type 2 or DL semi-persistent scheduling (SPS). The MCS index may be provided to the UE by RRC signaling related to UL configured grant type 1. When the TB attached with the CRC is larger than a maximum code block (CB) size for the selected LDPC base graph, the transmitting side may divide the TB attached with the CRC into a plurality of CBs. The transmitting side may further attach an additional CRC sequence to each CB. The maximum code block sizes for LDPC base graph 1 and LDPC base graph 2 may be 8448 bits and 3480 bits, respectively. When the TB attached with the CRC is not larger than the maximum CB size for the selected LDPC base graph, the transmitting side may encode the TB attached with the CRC to the selected LDPC base graph. The transmitting side may encode each CB of the TB to the selected LDPC basic graph. The LDPC CBs may be rate-matched individually. The CBs may be concatenated to generate a codeword for transmission on a PDSCH or a PUSCH. Up to two codewords (i.e., up to two TBs) may be transmitted simultaneously on the PDSCH. The PUSCH may be used for transmission of UL-SCH data and layer-1 and/or layer-2 control information. While not shown in FIG. 3, layer-1 and/or layer-2 control information may be multiplexed with a codeword for UL-SCH data.

In steps S101 and S102, the transmitting side may scramble and modulate the codeword. The bits of the codeword may be scrambled and modulated to produce a block of complex-valued modulation symbols.

In step S103, the transmitting side may perform layer mapping. The complexed-value modulation symbols of the codeword may be mapped to one or more MIMO layers. The codeword may be mapped to up to four layers. The PDSCH may carry two codewords, thus supporting up to 8-layer transmission. The PUSCH may support a single codeword, thus supporting up to 4-layer transmission.

In step S104, the transmitting side may perform precoding transform. A DL transmission waveform may be general OFDM using a CP. For DL, transform precoding (i.e., discrete Fourier transform (DFT)) may not be applied.

A UL transmission waveform may be conventional OFDM using a CP having a transform precoding function that performs DFT spreading which may be disabled or enabled. In the NR system, transform precoding, if enabled, may be selectively applied to UL. Transform precoding may be to spread UL data in a special way to reduce the PAPR of the waveform. Transform precoding may be a kind of DFT. That is, the NR system may support two options for the UL waveform. One of the two options may be CP-OFDM (same as DL waveform) and the other may be DFT-s-OFDM. Whether the UE should use CP-OFDM or DFT-s-OFDM may be determined by the BS through an RRC parameter.

In step S105, the transmitting side may perform subcarrier mapping. A layer may be mapped to an antenna port. In DL, transparent (non-codebook-based) mapping may be supported for layer-to-antenna port mapping, and how beamforming or MIMO precoding is performed may be transparent to the UE. In UL, both non-codebook-based mapping and codebook-based mapping may be supported for layer-to-antenna port mapping.

For each antenna port (i.e. layer) used for transmission of a physical channel (e.g. PDSCH, PUSCH, or PSSCH), the transmitting side may map complexed-value modulation symbols to subcarriers in an RB allocated to the physical channel.

In step S106, the transmitting side may perform OFDM modulation. A communication device of the transmitting side may add a CP and perform inverse fast Fourier transform (IFFT), thereby generating a time-continuous OFDM baseband signal on an antenna port p and a subcarrier spacing (SPS) configuration u for an OFDM symbol 1 within a TTI for the physical channel. For example, for each OFDM symbol, the communication device of the transmitting side may perform IFFT on a complex-valued modulation symbol mapped to an RB of the corresponding OFDM symbol. The communication device of the transmitting side may add a CP to the IFFT signal to generate an OFDM baseband signal.

In step S107, the transmitting side may perform up-conversion. The communication device of the transmitting side may upconvert the OFDM baseband signal, the SCS configuration u, and the OFDM symbol 1 for the antenna port p to a carrier frequency f0 of a cell to which the physical channel is allocated.

DRX (Discontinuous Reception) operation will be described below.

The UE may perform DRX operation while executing the processes and/or methods according to implementation(s) of the present disclosure. When the UE is configured with DRX, the UE may reduce power consumption by receiving DL signals discontinuously. DRX may be performed in RRC_IDLE, RRC_INACTIVE, and RRC_CONNECTED states. In the RRC_IDLE and RRC_INACTIVE states, DRX may be used by the UE to receive paging signals discontinuously. Hereinafter, DRX performed in the RRC_CONNECTED state will be described (RRC_CONNECTED DRX).

Figure 4:
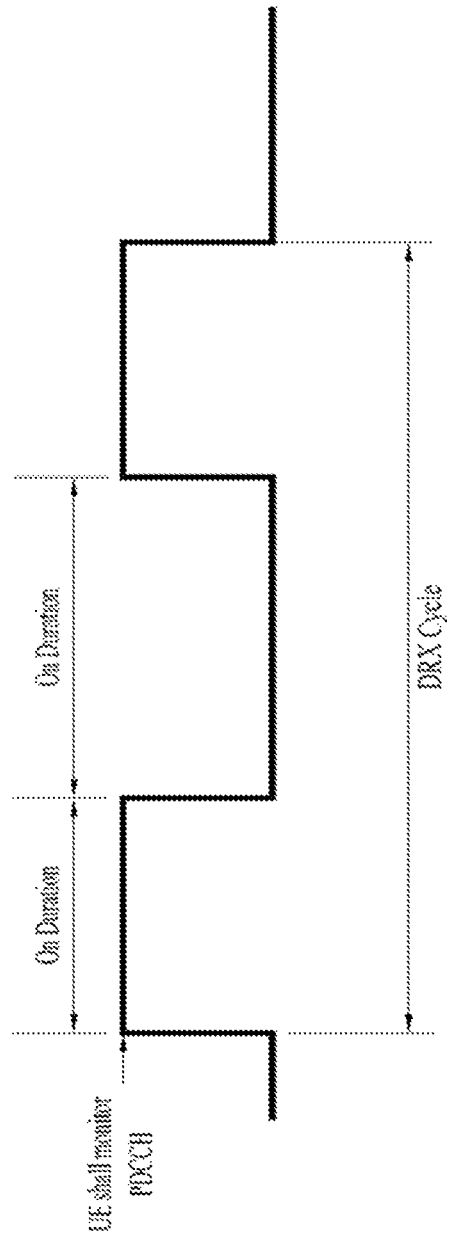
FIG. 4 illustrates a discontinuous reception (DRX) operation applicable to implementation(s) of the present disclosure.

FIG. 4 illustrates a discontinuous reception (DRX) operation applicable to implementation(s) of the present disclosure.

Figure 6:
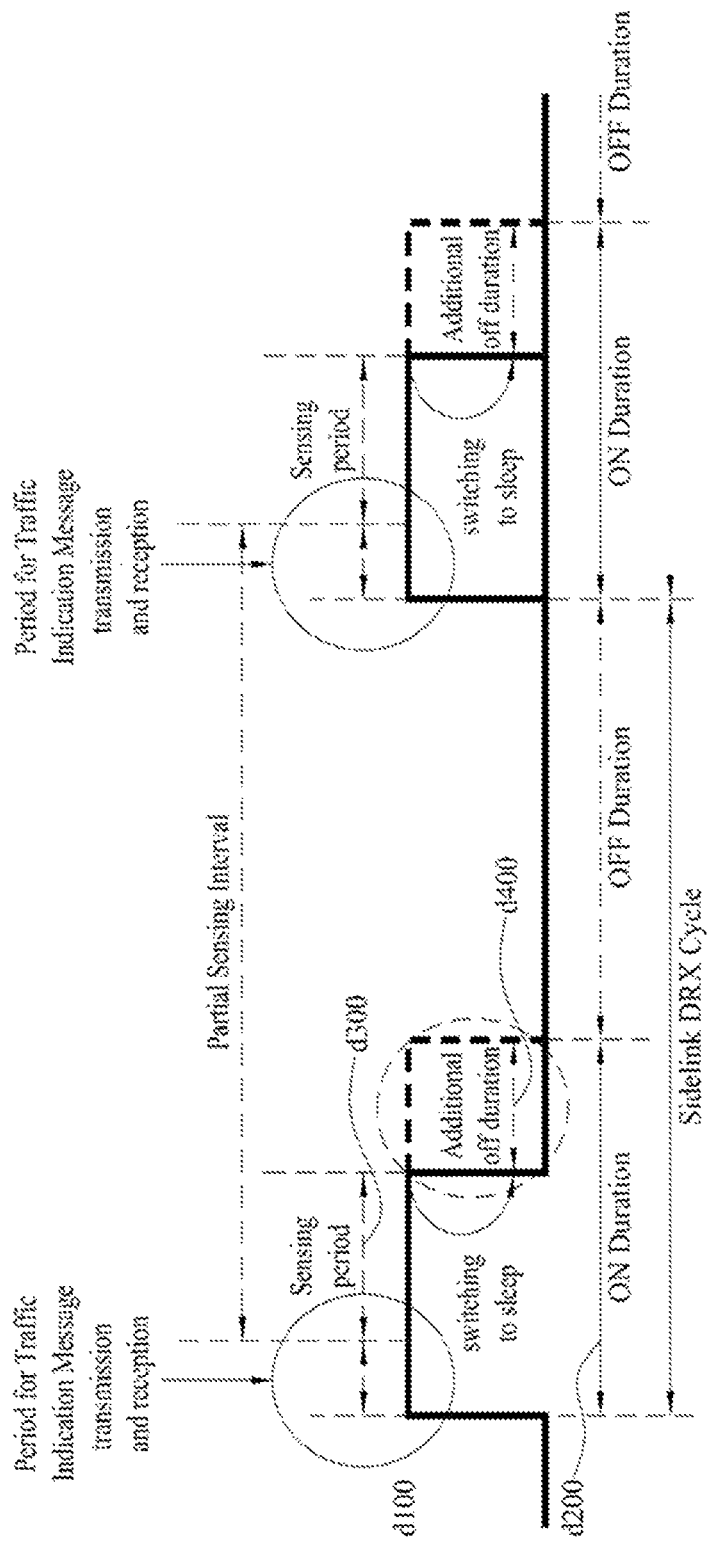

Referring to FIG. 6, a DRX cycle includes an ON duration and an opportunity for DRX. The DRX cycle defines a time interval in which the ON duration is periodically repeated. The ON duration is a time period for which the UE performs PDCCH monitoring to receive a PDCCH. When DRX is configured, the UE performs PDCCH monitoring during the ON duration. If the UE successfully detects any PDCCH during the PDCCH monitoring, the UE starts an inactivity timer and maintains an awake state. On the other hand, if the UE detects no PDCCH during the PDCCH monitoring, the UE enters a sleep state after expiration of the ON duration. Therefore, when DRX is configured, the UE may perform PDCCH monitoring/reception discontinuously in the time domain while performing the processes and/or methods according to implementation(s) of the present disclosure. For example, when DRX is configured, PDCCH reception occasions (e.g., a slot having a PDCCH search space) may be configured to be discontinuous depending on the DRX configuration. On the contrary, when no DRX is configured, the UE may perform PDCCH monitoring/reception continuously in the time domain while performing the processes and/or methods according to implementation(s) of the present disclosure. For example, when no DRX is configured, PDCCH reception occasions (e.g., a slot having a PDCCH search space) may be configured to be continuous. The PDCCH monitoring may not be allowed in a time period corresponding to a measurement gap, regardless of whether DRX is configured.

Table 9 shows UE procedures related to DRX. Referring to Table 1, DRX configuration information may be received by higher layer (RRC) signaling, and DRX ON/OFF may be controlled by a DRX command of the MAC layer. Once DRX is configured, the UE may perform the PDCCH monitoring discontinuously as shown in FIG. 4.

TABLE 9

| | Type of signals | UE procedure |
| --- | --- | --- |
| $1^{st}$ step | RRC signalling (MAC-CellGroupConfig) | Receive DRX configuration information |
| $2^{nd}$ Step | MAC CE ((Long) DRX command MAC CE) | Receive DRX command |
| $3^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following DRX related information.

Value of drx-On-durationTimer: defines the duration at the beginning of a DRX cycle.

Value of drx-InactivityTimer: defines the duration in which the UE is in the awake state after a PDCCH occasion in which a PDCCH indicating initial UL or DL data is detected.

Value of drx-HARQ-RTT-TimerDL: defines the maximum duration until DL retransmission is received after reception of initial DL transmission.

Value of drx-HARQ-RTT-TimerDL: defines the maximum duration until a grant for UL retransmission is received after reception of a grant for initial UL transmission.

drx-LongCycleStartOffset: defines the duration and starting time of a DRX cycle.

drx-ShortCycle (optional): defines the duration of a short DRX cycle.

When any one of drx-On-durationTimer, drx-InactivityTimer, drx-HARQ-RTT-TimerDL, and drx-HARQ-RTT-TimerDL is running, the UE performs the PDCCH monitoring on each PDCCH occasion while maintaining the awake state.

Embodiment

Release 17 NR V2X may support a sidelink discontinuous reception (DRX) operation of a user equipment (UE).

The present disclosure may propose a method for additional power saving in an on-duration section of sidelink DRX by a UE for performing the sidelink DRX operation.

A transmission UE used in the present disclosure may refer to a UE for transmitting sidelink traffic. A reception UE may refer to a UE for receiving sidelink traffic transmitted by the transmission UE without sidelink traffic to be transmitted.

The transmission UE or the reception UE used in the present disclosure is only a relative meaning, and the operation is not limited thereto. For example, the transmission UE may be operated as a reception UE, and the reception UE may be operated as a transmission UE. The transmission UE or the reception UE may be referred to as a first UE or a second UE.

Hereinafter, various embodiments of the present disclosure may propose a method of additional power saving of a UE for supporting a DRX operation and an apparatus for supporting the method. Various embodiments of the present specification may be combined with a channel coding operation of a UE. The embodiments described below may be combined with other embodiments.

According to an embodiment of the present disclosure, the UE for supporting sidelink DRX may broadcast a sidelink traffic indication message indicating whether there is sidelink traffic to be transmitted by the UE in a sidelink DRX on-duration section, to UEs for supporting neighboring sidelink DRX.

For example, when the sidelink traffic indication message is configured to 1, this may mean that there is traffic or data to be transmitted by a transmission UE. In addition, when the sidelink traffic indication message is configured to 0, this may mean that there is no traffic or data to be transmitted by the transmission UE.

For example, the UE may transmit the sidelink traffic indication message during the duration of an SL drx-TrafficIndicationTimer operating in the sidelink DRX on-duration section. The UE may receive a sidelink traffic indication message transmitted by another neighboring UE during the SL drx-TrafficIndicationTimer duration. The sidelink traffic indication message transmitted by the UE may be broadcast to a neighboring UE using a broadcast method or a groupcast method.

Sidelink DRX configurations for a sidelink DRX operation of the UE may be as follows.

SL drx-TrafficIndicationTimer: The duration the UE transmits/receives sidelink traffic indication message. This timer is started at the beginning of a SL drx-on-durationTimer.

SL drx-on-durationTimer: The duration at the beginning of a DRX Cycle

SL drx-SlotOffset: The delay before starting the drx-on-durationTimer

SL drx-InactivityTimer: The duration after the PSCCH occasion in which a PDCCH indicates a new UL or DL transmission for the MAC entity SL drx-RetransmissionTimer (per HARQ process): The maximum duration until a retransmission is received SL drx-LongCycleStartOffset: The Long DRX cycle and drx-StartOffset which defines the subframe where the Long and Short DRX Cycle starts SL drx-ShortCycle (optional): The Short DRX cycle SL drx-ShortCycleTimer (optional): The duration the UE shall follow the Short DRX cycle SL drx-HARQ-RTT-Timer (per HARQ process): The minimum duration before an assignment for HARQ retransmission is expected by the MAC entity FIG. 5 is a diagram for explaining an embodiment of the present disclosure.

Figure 5:
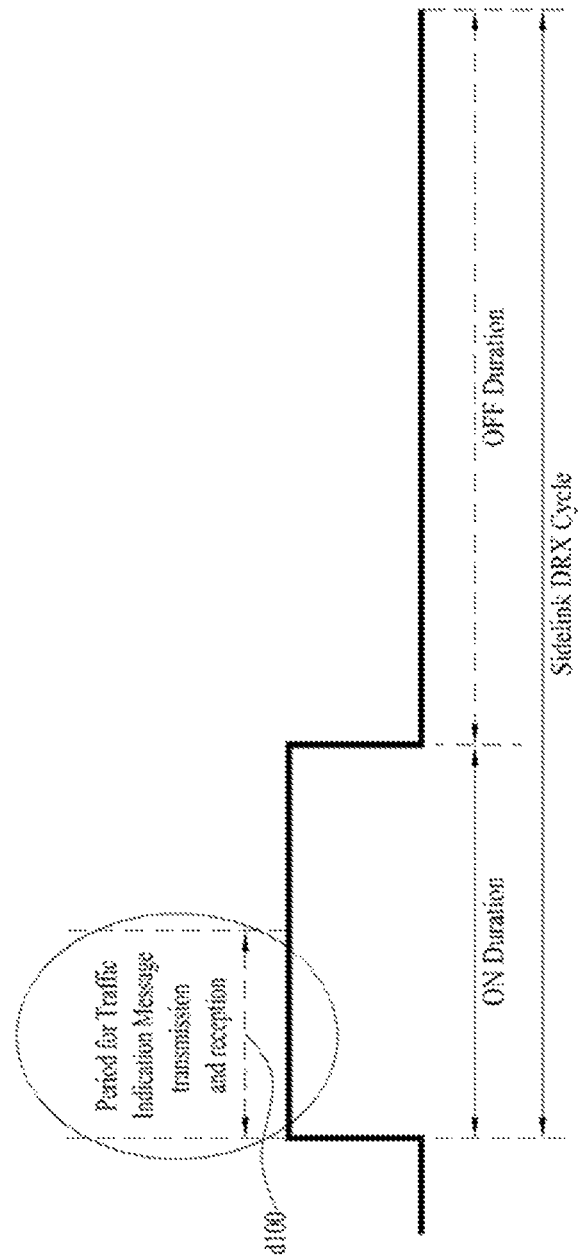
FIGS. 5 to 9 are diagrams for explaining embodiment(s).

Referring to FIG. 5, duration d100 may be an SL drx-TrafficIndicationTimer duration. A UE may transmit or receive a sidelink traffic indication message during a DRX traffic indication timer duration. Here, the DRX traffic indication message may be a message indicating whether there is sidelink traffic to be transmitted by a UE in an on-duration section.

In other words, in a sidelink DRX operation, when there is the sidelink traffic to be transmitted by a UE during a specific time (i.e., a sidelink traffic indication timer duration)

in the sidelink DRX on-duration section, the UE may inform a neighboring UE that there is the sidelink traffic to be transmitted by the UE by broadcasting a sidelink traffic indication message to the neighboring UE.

Alternatively, the UE may broadcast a sidelink traffic indication message indicating that there is no sidelink traffic to the neighboring UE when there is no sidelink traffic to be transmitted by the UE.

The UE may receive the sidelink traffic indication message broadcast by the neighboring UE during the sidelink traffic indication timer duration and may recognize whether there is sidelink traffic to be transmitted to the UE by the neighboring UE.

According to an embodiment of the present disclosure, a method for acquiring an additional power saving gain in the sidelink DRX on-duration section by the UE using the aforementioned sidelink traffic indication message will be described.

As described above, the transmission UE may broadcast to the neighboring UE whether there is sidelink traffic to be transmitted by the transmission UE during the SL drx-TrafficIndicationTimer using the sidelink traffic indication message. The transmission UE may receive the sidelink traffic indication message transmitted by the neighboring UE during the SL drx-TrafficIndicationTimer and may recognize whether there is sidelink traffic to be received from the neighboring UE.

For example, the transmission UE may check that there is no sidelink traffic to be transmitted by the transmission UE in a sidelink DRX on-duration section and may check that there is no sidelink traffic to be received from a neighboring UE in the current sidelink DRX on-duration section by checking the sidelink traffic indication message received from the neighboring UE during the sidelink traffic transmission/reception duration (i.e., SL drx-TrafficIndicationTimer). In this case, the transmission UE may perform an additional power saving operation in the remaining sidelink DRX on-duration section.

For example, when the transmission UE performs a partial sensing operation for a sidelink transmission traffic that may occur in the future, if a partial sensing operation duration overlaps in the current sidelink DRX on-duration section, a sensing operation in the current partial sensing duration is completed in the sidelink DRX on-duration section, and a next partial sensing operation duration is not present in the current sidelink DRX on-duration section, the transmission UE may operate in a sleep mode by switching the remaining current sidelink DRX on-duration section into a sidelink off-duration.

In other words, when there is no sidelink traffic to be transmitted in the current sidelink DRX on-duration section, there is no sidelink traffic to be received therein, and a sensing operation is not performed in the current sidelink DRX on-duration section, the transmission UE may operate the remaining current sidelink DRX on-duration section in a sleep mode. As such, the transmission UE may acquire an additional power saving gain in the sidelink DRX on-duration section.

FIG. 6 is a diagram showing a power saving operation in a sidelink DRX on-duration section in terms of a transmission UE according to an embodiment.

Referring to FIG. 6, duration d200 may be an on-duration section, and duration d100 may be an SL drx-TrafficIndicationTimer duration. The UE may sense a PSCCH and/or a PSSCH during a sensing duration d300. If there is no sidelink traffic to be transmitted from the transmission UE and there is no sidelink traffic to be received from a neighboring UE, when a sensing operation is performed throughout the remaining on-duration section, this may result in wasting power of a sidelink UE.

Thus, according to an embodiment of the present disclosure, there is no sidelink traffic to be transmitted by a UE and there is no sidelink traffic to be received from a neighboring UE, a sensing operation may be stopped before an on-duration section ends, and an operation may be performed in a sleep mode during duration d400. When there is no sidelink traffic to be transmitted by the UE, and the UE is not capable of receiving a sidelink traffic indication message indicating that there is sidelink traffic to be transmitted from the neighboring UE, the UE may not perform a sensing operation during duration d400 to save power.

Figure 7:
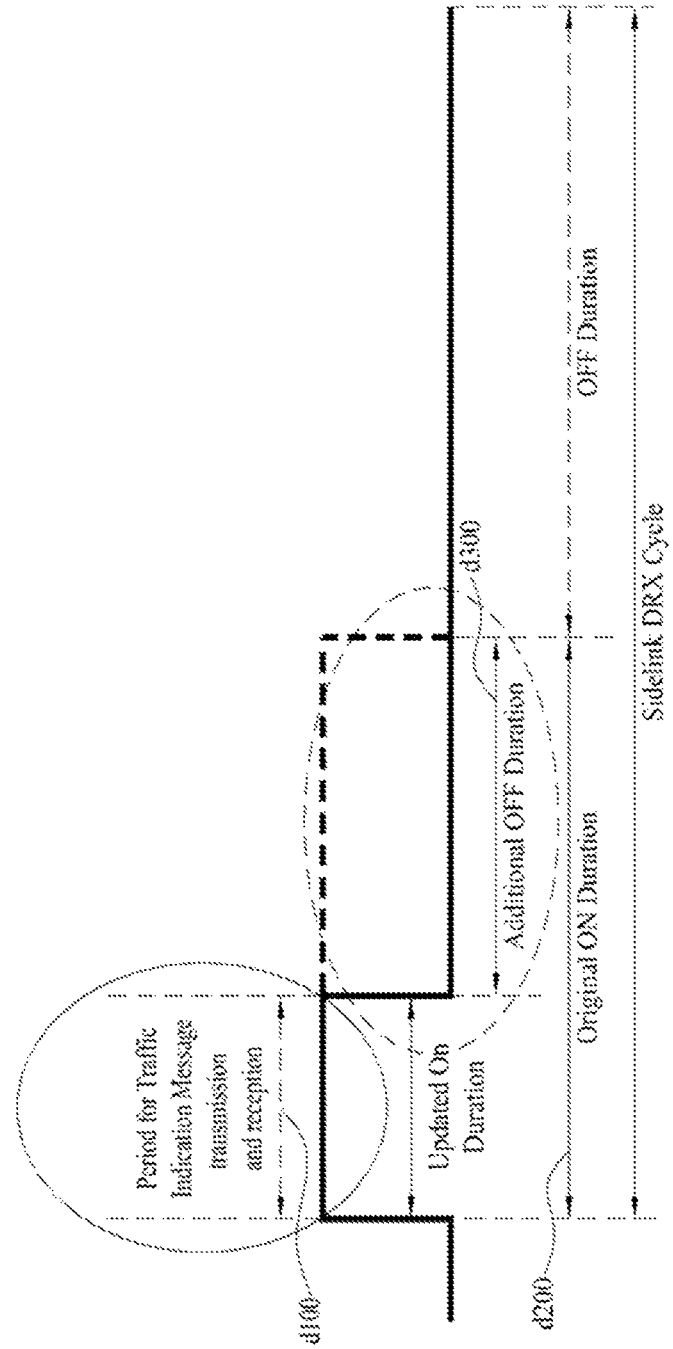

FIG. 7 is a diagram showing a power saving operation in a sidelink DRX on-duration section in terms of a reception UE according to an embodiment.

Referring to FIG. 7, the reception UE may operate a SL drx-TrafficIndicationTimer in duration d100 to transmit/receive a sidelink traffic indication message. The UE may check that there is no traffic to be transmitted from neighboring UEs during an SL drx-TrafficIndicationTimer duration by receiving a traffic indication message. In addition, the UE may transition the remaining on-duration section into an additional off-duration section d300 in the current sidelink DRX on-duration section d200 and may operate in a sleep mode.

That is, when there is no sidelink traffic to be transmitted by a UE and there is no sidelink traffic to be received from a neighboring UE, the UE may be transitioned into an off-duration section before an on-duration section ends after a DRX traffic indication timer duration ends, and thus the UE may ensure an additional off-duration section and may perform a power saving operation.

When there is no sidelink traffic to be transmitted by a UE and the UE is not capable of receiving a sidelink traffic indication message indicating that there is sidelink traffic to be transmitted from a neighboring UE, the UE may stop a sensing operation via transition into an off-duration section before an on-duration section ends after a DRX traffic indication timer duration ends.

An embodiment of the present disclosure proposes that, when receiving only a traffic indication message indicating that there is not data to be transmitted from a neighboring UE, the UE may monitor only a PSCCH including first SCI and may not monitor a PSSCH including second SCI.

For example, the traffic indication message may be included in the first SCI. The UE may monitor the PSCCH including the first SCI during an on-duration section and may receive or decode a traffic indication message included in the SCI. When the traffic indication message received from neighboring UEs indicates that there is no data to be transmitted, the UE may monitor the PSSCH including the second SCI. Alternatively, when at least one of traffic indication messages received from the neighboring UEs indicates that there is data to be transmitted, the UE may monitor the PSSCH including the second SCI. When decoding the second SCI to check that the second SCI is second SCI transmitted to the UE, the UE may receive the PSSCH based on the first SCI and the second SCI.

Figure 8:
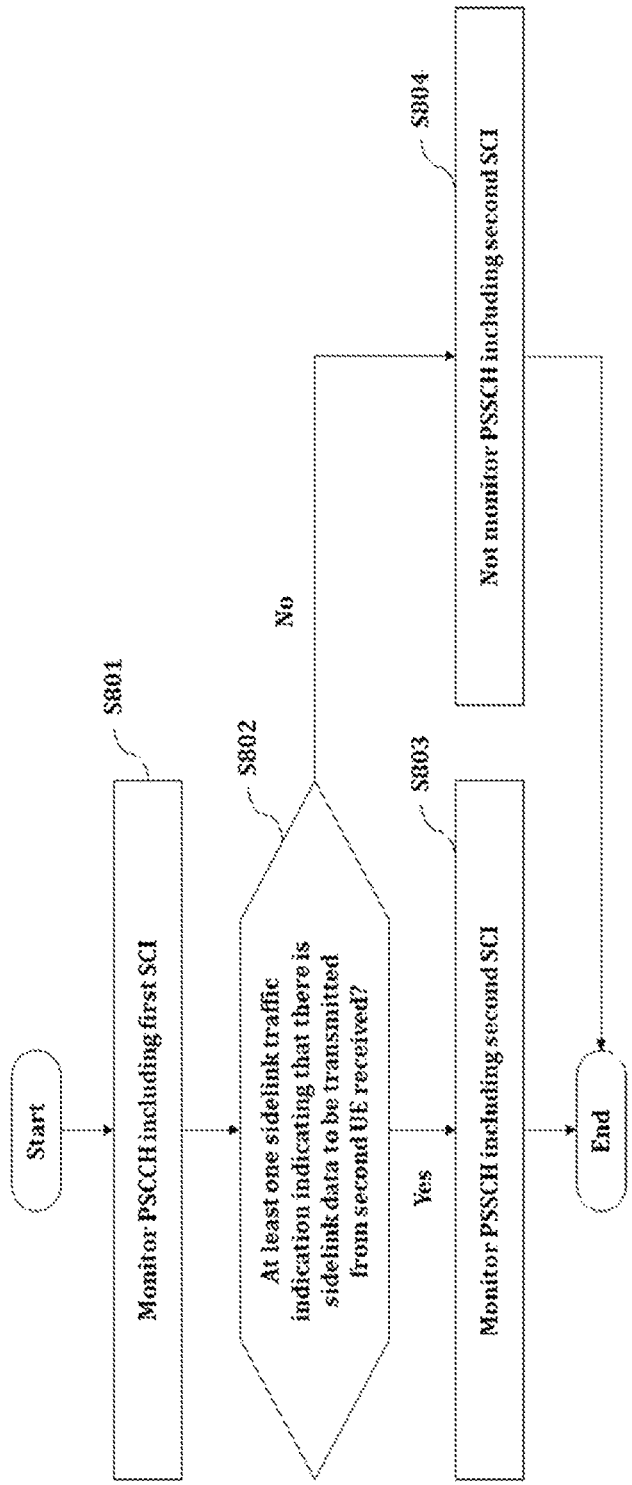

FIG. 8 is a diagram for explaining an embodiment of the present disclosure.

Referring to FIG. 8, in operation S801, a UE may monitor a physical sidelink control channel (PSCCH) including first sidelink control information (SCI) in an on-duration section. The first SCI may include scheduling information of second SCI and a PSSCH.

In operation S802, whether a first UE receives at least one sidelink traffic indication indicating that there is sidelink data to be transmitted from a second UE may be determined. The second UE may be one or more UEs. For example, when the sidelink traffic indication is 1, the second UE may indicate that there is sidelink data to be transmitted to the first UE. In addition, when the sidelink traffic indication is 0, the second UE may indicate that there is no sidelink data to be transmitted to the first UE.

In operation S803, based on that the first UE receives at least one sidelink traffic indication indicating that there is sidelink data to be transmitted from the second UE, the first UE may monitor a PSSCH including the second SCI.

In operation S804, based on that the first UE does not receive at least one sidelink traffic indication indicating that there is sidelink data to be transmitted from the second UE, the first UE may not monitor the PSSCH including the second SCI. Even if there is no sidelink data to be received from a neighboring UE, when the PSSCH including the second SCI needs to be monitored, this may result in unnecessary wasting power. When receiving an indication in that there is no sidelink data to be received from a neighboring UE by a sidelink UE using the method proposed according to the present disclosure, the UE may not monitor the PSSCH including the second SCI, thereby achieving an additional power saving effect.

When the first UE receives the second SCI, the first UE may determine whether the second SCI is for the first UE based on the second SCI. For example, based on that a source L1 identifier included in the second SCI is the same as a unicast destination L1 identifier of the first UE or a destination L1 identifier included in the second SCI is the same as a unicast source L1 identifier of the first UE, the first UE may determine that the second SCI is for the first UE. Alternatively, based on that a groupcast/broadcast destination L1 identifier included in the second SCI is the same as a groupcast/broadcast destination L1 identifier of the first UE, the first UE may determine that the second SCI is for the first UE.

When determining that the second SCI is for the first UE, the first UE may receive a PSSCH including sidelink data based on the first SCI and the second SCI.

When a reception UE receives only a traffic indication message (e.g., a traffic indication being 0) indicating that there is no data to be transmitted from neighboring transmission UEs during an SL drx-on-durationTimer duration of the reception UE, that is, when the reception UE does not receive any traffic indication message (e.g., a traffic indication being 1) indicating that there is transmission data from neighboring UEs, the reception UE may monitor or decode only a PSCCH (1$^{st}$ SCI) in order to monitor or sense a sidelink channel or a sidelink signal in a SL DRX on-duration section of the reception UE.

When the reception UE receives at least one traffic indication message (e.g., a traffic indication being 1) indicating that there is transmission data from neighboring transmission UEs during an SL drx-on-durationTimer duration of the reception UE, the reception UE may perform a procedure of checking whether intended SCI is transferred to the reception UE by monitoring or decoding a PSCCH (1$^{st}$ SCI) or simultaneously monitoring or decoding a PSSCH (2$^{nd}$ SCI) in order to monitor or sense a sidelink channel or a sidelink signal in a sidelink DRX on-duration section of the reception UE.

The present disclosure proposes that, when the reception UE checks that the reception UE is an intended UE by receiving a PSSCH (2$^{nd}$ SCI) from a counterpart transmission UE and checking a source L1 ID and a destination L1 ID included in the received 2$^{nd}$ SCI, the reception UE monitors a PSSCH (SL data) transmitted by the transmission UE as well as the PSSCH (2$^{nd}$ SCI).

The reception UE receiving the 2$^{nd}$ SCI may determine whether the reception UE is an intended UE as follows.

Unicast

When a source L1 ID (a source L1 of the transmission UE) included in the received 2$^{nd}$ SCI (SCI transmitted by a transmission UE with unicast connection) is the same as a unicast destination L1 ID of the reception UE, and a destination L1 ID (a destination L1 ID of a transmission UE) included in the 2$^{nd}$ SCI is the same as a unicast source L1 ID of the reception UE, the reception UE may determine that the reception UE is an intended UE.

Groupcast/Broadcast

When a groupcast/broadcast destination L1 ID included in the received 2$^{nd}$ SCI is the same as a groupcast/broadcast destination L1 ID of the reception UE, the reception UE may determine that the reception UE is an intended UE.

Figure 9:
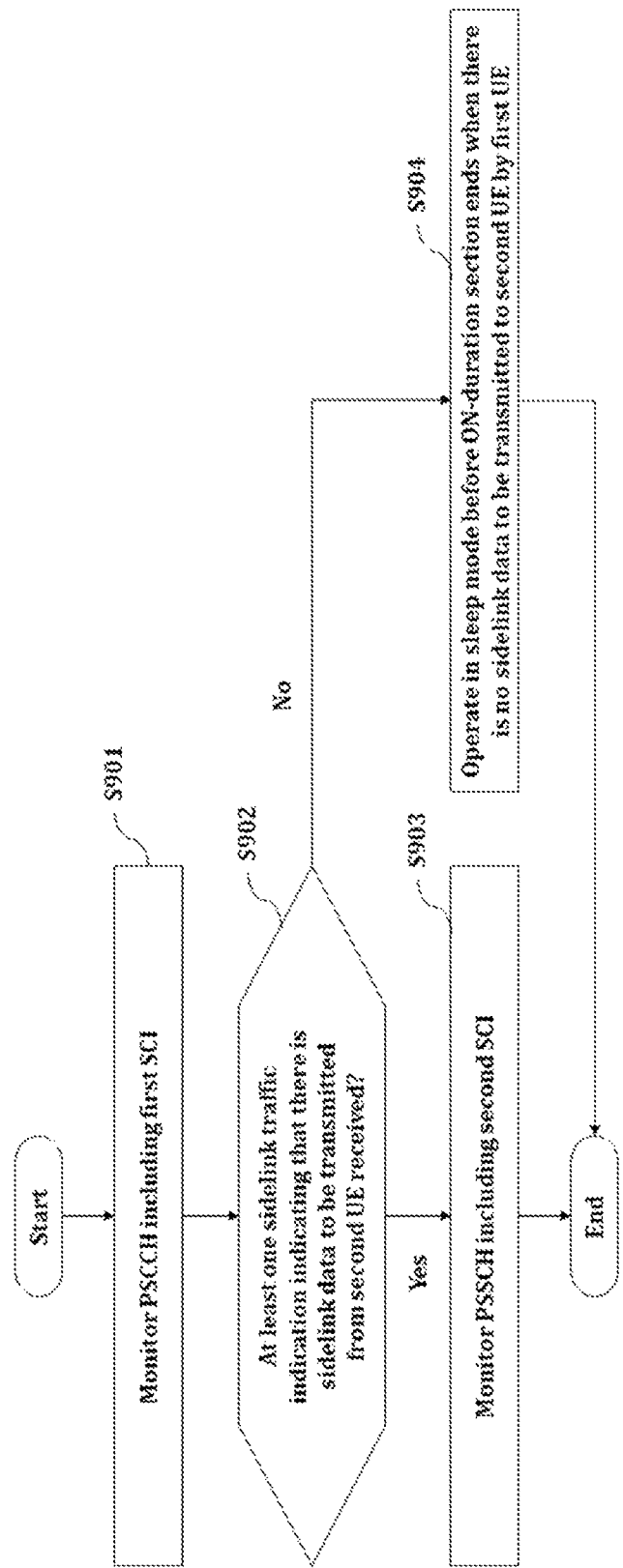

FIG. 9 is a diagram for explaining an embodiment of the present disclosure.

Referring to FIG. 9, operations S901 to S903 may be the same as in the method described above with reference to FIG. 8.

In operation S904, the first UE may not receive a sidelink traffic indication indicating that there is sidelink data to be transmitted from the second UE, and when there is no sidelink data to be transmitted to the second UE by the first UE, the first UE may be transitioned to a sleep mode before an on-duration section ends and may operate in the sleep mode. That is, when all sidelink traffic indications received from a neighboring UE by the first UE are indicated as 0 (i.e., which means that there is no sidelink data to be transmitted) and there is no sidelink data to be transmitted to the neighboring UE by the first UE, the first UE may be first switched to an off-duration before an on-duration section ends, thereby achieving an additional power saving effect. When operating in the sleep mode, the first UE may stop monitoring a PSCCH including the first SCI.

The traffic indication message proposed according to the present disclosure may be replaced with a sidelink DRX command MAC CE (for stopping the currently operating SL DRX timer and transitioning to a sleep mode when there is no indication of whether there is sidelink data to be transmitted or no sidelink data to be transmitted) or the like.

The Sidelink DRX timer stated in the present disclosure may be used for the following purpose.

SL drx-on-durationTimer: Sidelink The duration in which a UE performing a DRX operation needs to basically operate at an active time for PSCCH/PSSCH reception of a counterpart UE Sidelink DRX Inactivity Timer: The duration for extending a sidelink DRX On-duration section which is a duration in which a UE performing a sidelink DRX operation needs to basically operate at an active time for PSCCH/PSSCH reception of a counterpart UE. That is, the SL drx-on-durationTimer may be extended by the Sidelink DRX Inactivity Timer duration. When receiving a new packet (new PSSCH transmission) from a counterpart UE, a UE may start the Sidelink DRX Inactivity Timer and may extend the SL drx-on-durationTimer.

Sidelink DRX HARQ RTT Timer: The duration in which a UE performing a Sidelink DRX operation operates in a sleep mode until receiving a retransmission packet (or PSSCH assignment) transmitted by a counterpart UE. That is, when starting the Sidelink DRX HARQ RTT Timer, the UE may determine that the counterpart UE does not transmit a sidelink retransmission packet to the UE until the Sidelink DRX HARQ RTT Timer expires and may operate in a sleep mode during the corresponding timer.

Sidelink DRX Retransmission Timer: The duration in which a UE performing a Sidelink DRX operation operates at an active time in order to receive a retransmission packet (or PSSCH assignment) transmitted by a counterpart UE. During the corresponding timer, the UE may monitor reception of a retransmission sidelink packet (or PSSCH assignment) transmitted by the counterpart UE.

The title of the timer in the present disclosure (Uu DRX HARQ RTT TimerSL, Uu DRX Retransmission TimerSL, SL drx-on-durationTimer, Sidelink DRX Inactivity Timer, Sidelink DRX HARQ RTT Timer, Sidelink DRX Retransmission Timer, etc.) may be exemplary, and a timer performing the same/similar function based on the description of each timer may be regarded as the same/similar timer irrespective of the title thereof.

The proposal of the present disclosure may be a solution applicable and expandable as a method to solve a problem of loss due to interruption during Uu Bandwidth Part (BWP) switching.

The proposal of the present disclosure may also be a solution applicable and expandable as a method to solve a problem of loss due to interruption during Uu Bandwidth Part (BWP) switching when a UE supports a Sidelink Multiple Bandwidth Part (BWP).

The proposal of the present disclosure may also be extensively applied to a parameter included in a UE-Pair Specific Sidelink DRX configuration, a UE-Pair Specific Sidelink DRX pattern, or a UE-Pair Specific Sidelink DRX configuration as well as a parameter (and timer) included in a Default/Common Sidelink DRX configuration, a Default/Common Sidelink DRX pattern, or a Default/Common Sidelink DRX configuration. The term On-duration stated in the proposal of the present disclosure may be extensively interpreted as an active time duration (a wake-up state (the duration in which an RF module operates in " ") for transmitting/receiving a wireless signal), and the term Off-duration may be extensively interpreted as a sleep time duration (a sleep-mode state for power saving (the duration in which an RF module operates in " ") and may not mean that the transmitting UE needs to operate in a sleep mode during a sleep time duration. If necessary, even in a sleep time, it may be allowed to operate in an active time for a while for a sensing operation/transmission operation). In addition, "whether (some) proposed methods/rules according to the present disclosure are applied, and/or a related parameter (e.g., a threshold value) may be specifically (differently, or independently) configured according to a resource pool, a congestion level, a service priority (and/or a type), QoS requirements (e.g., Latency or Reliability), a PQI, a traffic type (e.g., (a)periodical generation), Sidelink transmission resource allocation mode (mode 1 or mode 2), or the like.".

For example, whether the proposed rule according to the present disclosure is applied (and/or a related parameter setting value) may also be specifically (independently or differently) configured with respect to at least one of a resource pool, a service/packet type (and/or a priority), QoS requirements (e.g., URLLC/EMBB Traffic, Reliability, or Latency), a PQI, a Cast Type (e.g., Unicast, Groupcast, or Broadcast), a (resource pool) congestion level (e.g., CBR), an SL HARQ feedback method (e.g., NACK Only Feedback or ACK/NACK Feedback), transmission of a HARQ Feedback Enabled MAC PDU (and/or a HARQ Feedback Disabled MAC PDU), whether to configure an SL HARQ feedback report operation based on a PUCCH, performing of pre-emption (and/or Re-Evaluation) (or resource reselection based thereon), an (L2 or L1) (source and/or destination) identifier, an (L2 or L1) (combination of a source layer ID and a destination layer ID) identifier, an (L2 or L1) (combination of a pair of Source layer ID and Destination layer ID and a Cast type) identifier, a direction of a pair of Source layer ID and Destination layer ID, a PC5 RRC Connection/Link, performing of SL DRX, an SL Mode type (resource allocation mode 1 or a resource allocation mode 2), or performing of (a)periodic resource reservation.

The term "predetermined time" stated in the present disclosure may refer to a time in which a UE operates at an active time corresponding to a predefined time or operates at an active time corresponding to a specific timer (a Sidelink DRX Retransmission Timer, a Sidelink DRX Inactivity Timer, or a timer to ensure an operation at an active time in a DRX operation of a reception UE) in order to receive a sidelink signal or sidelink data from a counterpart UE.

The proposal and whether to apply the proposed rule according to the present disclosure (and/or a related parameter setting value) may also be applied to an mmWave Sidelink operation.

According to various embodiments of the present disclosure, an additional power saving gain may be acquired via transition to a sleep mode or simplification of a monitoring operation using the proposed method during a sidelink on-duration section when a UE supports a sidelink DRX operation.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 10:
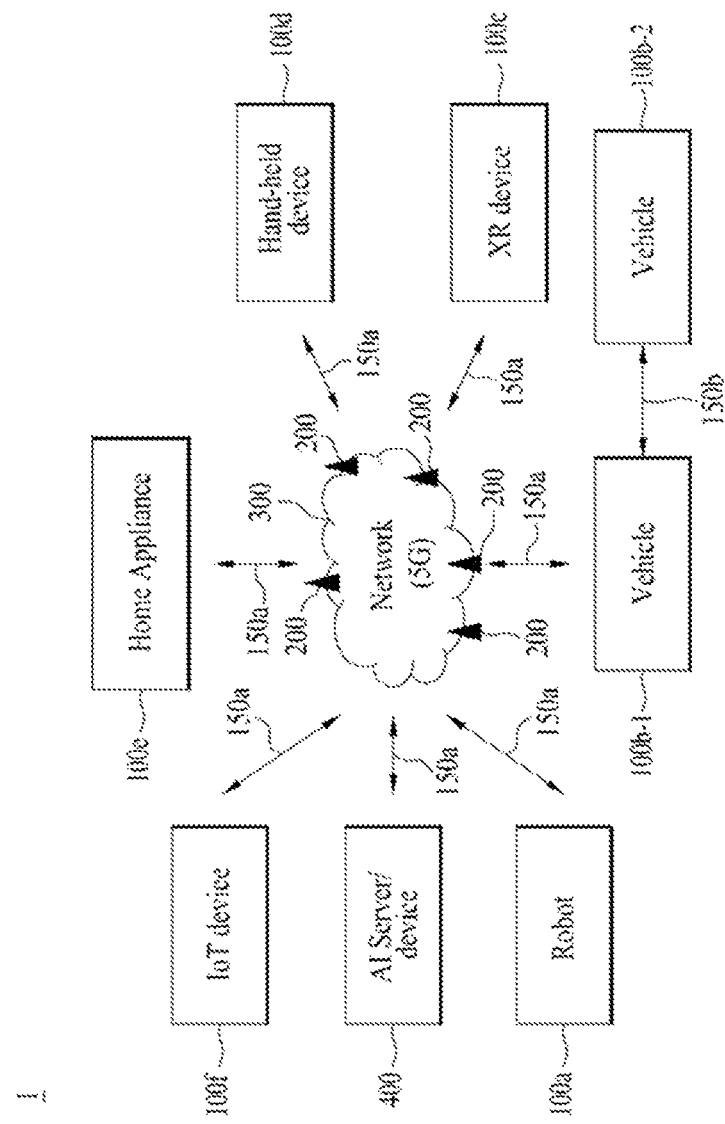
FIGS. 10 to 19 are block diagrams illustrating various devices applicable to embodiment(s) of the present disclosure.

FIG. 10 illustrates a communication system 1 applied to the present disclosure.

Referring to FIG. 10, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/ the wireless devices may transmit/receive radio signals to/from each other through the wireless communication/ connections 150a and 150b. For example, the wireless communication/connections 150a and 150b may transmit/ receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 11:
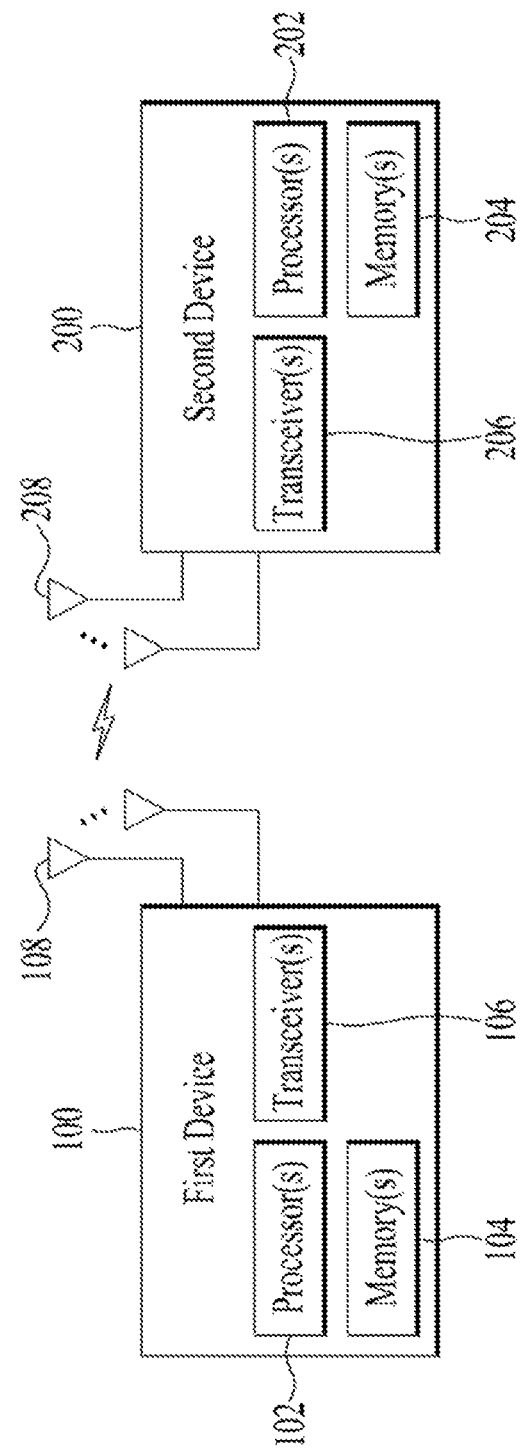

FIG. 11 illustrates wireless devices applicable to the present disclosure.

Referring to FIG. 11, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 10.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/ circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Here, a wireless communication technology implemented in the wireless devices 100 and 200 of the present disclosure may include Narrowband Internet of Things for low power communication as well as LTE, NR, and 6G. In this case, for example, the NB-IoT technology may be an example of a Low Power Wide Area Network (LPWAN) technology and may be implemented in standards such as LTE category (Cat) NB1 and/or LTE Cat NB2, and is not limited to the above-described name. Additionally or alternatively, the wireless communication technology implemented in the wireless devices 100 and 200 according to the present disclosure may perform communication based on the LTE-M technology. In this case, for example, LTE-M technology may be an example of the LPWAN technology and may be called various terms such as enhanced Machine Type Communication (eMTC). For example, the LTE-M technology may be implemented as at least one of various standards such as 1) LTE Category (LTE CAT) 0, 2) LTE Cat M1, 3) LTE Cat M2, 4) LTE non-Bandwidth Limited (non-BL), 5) LTE-MTC, 6) LTE Machine Type Communication, and/or 7) LTE M and may not be limited to the aforementioned terms. Additionally or alternatively, the wireless communication technology implemented in the wireless devices 100 and 200 according to the present disclosure may include at least one of ZigBee, Bluetooth, or Low Power Wide Area Network (LPWAN) in consideration of low power communication and is not limited to the aforementioned terms. For example, the ZigBee technology may generate personal area networks (PAN) related to small/low-power digital communication based on various standards such as IEEE 802.15.4 and may be called various terms.

Examples of Signal Process Circuit Applicable to the Present Disclosure

Figure 12:
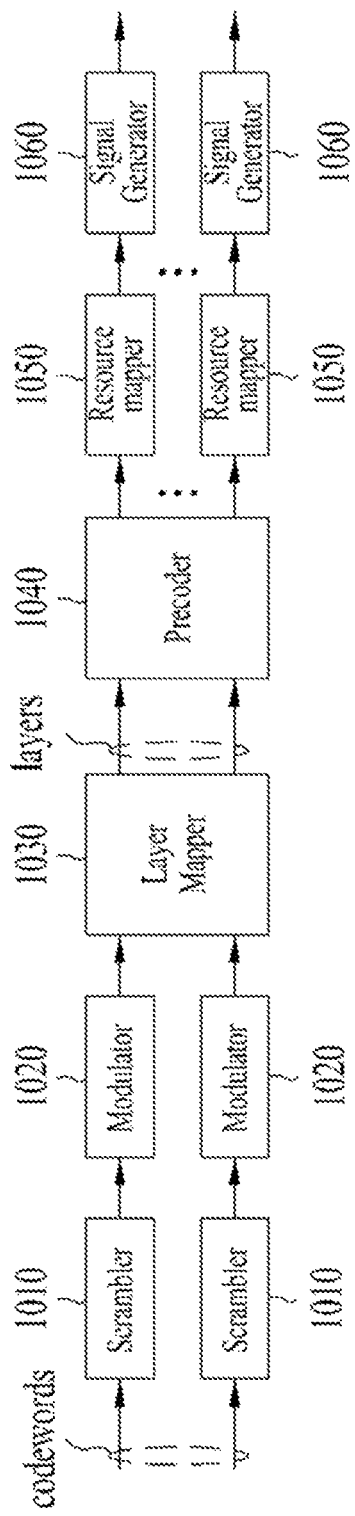

FIG. 12 illustrates a signal process circuit for a transmission signal.

Referring to FIG. 12, a signal processing circuit 1000 may include scramblers 1010, modulators 1020, a layer mapper 1030, a precoder 1040, resource mappers 1050, and signal generators 1060. An operation/function of FIG. 12 may be performed, without being limited to, the processors 102 and 202 and/or the transceivers 106 and 206 of FIG. 11. Hardware elements of FIG. 12 may be implemented by the processors 102 and 202 and/or the transceivers 106 and 206 of FIG. 11. For example, blocks 1010 to 1060 may be implemented by the processors 102 and 202 of FIG. 11. Alternatively, the blocks 1010 to 1050 may be implemented by the processors 102 and 202 of FIG. 11 and the block 1060 may be implemented by the transceivers 106 and 206 of FIG. 11.

Codewords may be converted into radio signals via the signal processing circuit 1000 of FIG. 12. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include IFFT modules, CP inserters, digital-to-analog converters (DACs), and frequency up-converters.

Signal processing procedures for a signal received in the wireless device may be configured in a reverse manner of the signal processing procedures 1010 to 1060 of FIG. 12. For example, the wireless devices (e.g., 100 and 200 of FIG. 11) may receive radio signals from the exterior through the antenna ports/transceivers. The received radio signals may be converted into baseband signals through signal restorers. To this end, the signal restorers may include frequency DL converters, analog-to-digital converters (ADCs), CP remover, and FFT modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Examples of Application of Wireless Device Applicable to the Present Disclosure

Figure 13:
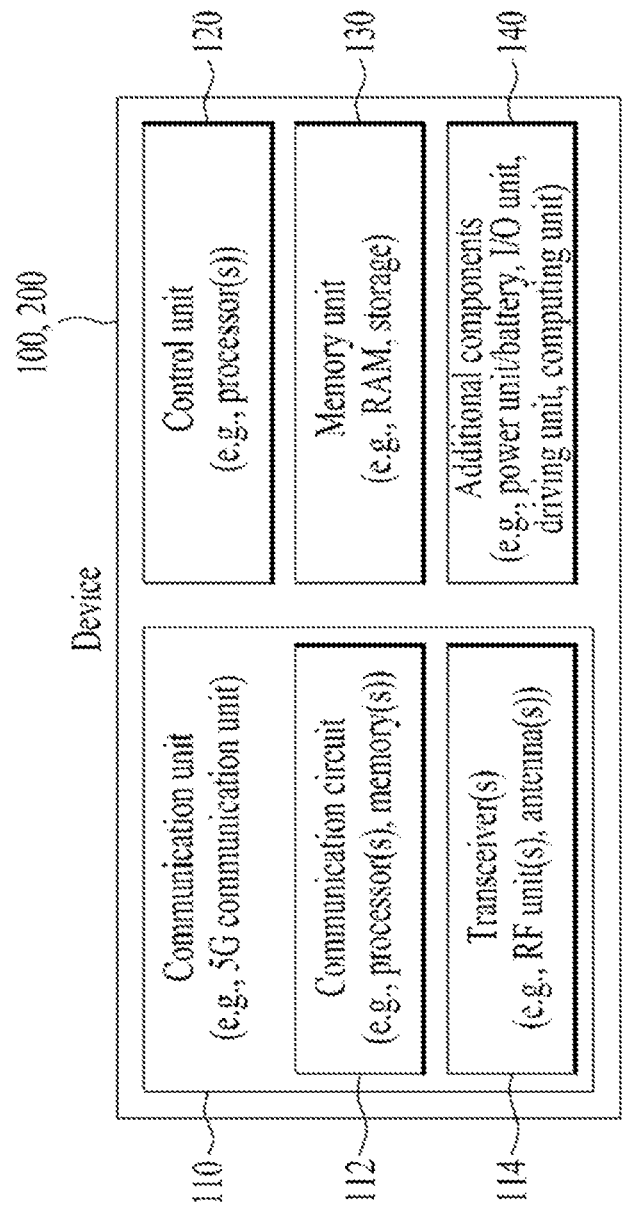

FIG. 13 illustrates another example of a wireless device applied to the present disclosure. The wireless device may be implemented in various forms according to a use-case/service (refer to FIG. 10).

Referring to FIG. 13 wireless devices 100 and 200 may correspond to the wireless devices 100 and 200 of FIG. 11 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 11. For example, the transceiver(s) 114 may include the one or more transceivers 106 and 206 and/or the one or more antennas 108 and 208 of FIG. 11. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 10), the vehicles (100b-1 and 100b-2 of FIG. 10), the XR device (100c of FIG. 10), the hand-held device (100d of FIG. 10), the home appliance (100e of FIG. 10), the IoT device (100f of FIG. 10), a digital broadcast terminal, a hologram device, a public safety device, an MTC device, a medicine device, a FinTech device (or a finance device), a security device, a climate/environment device, the AI server/device (400 of FIG. 10), the BSs (200 of FIG. 10), a network node, etc. The wireless device may be used in a mobile or fixed place according to a use-example/service.

In FIG. 13, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Hereinafter, an example of implementing FIG. 13 will be described in detail with reference to the drawings.

Examples of a Hand-Held Device Applicable to the Present Disclosure

Figure 14:
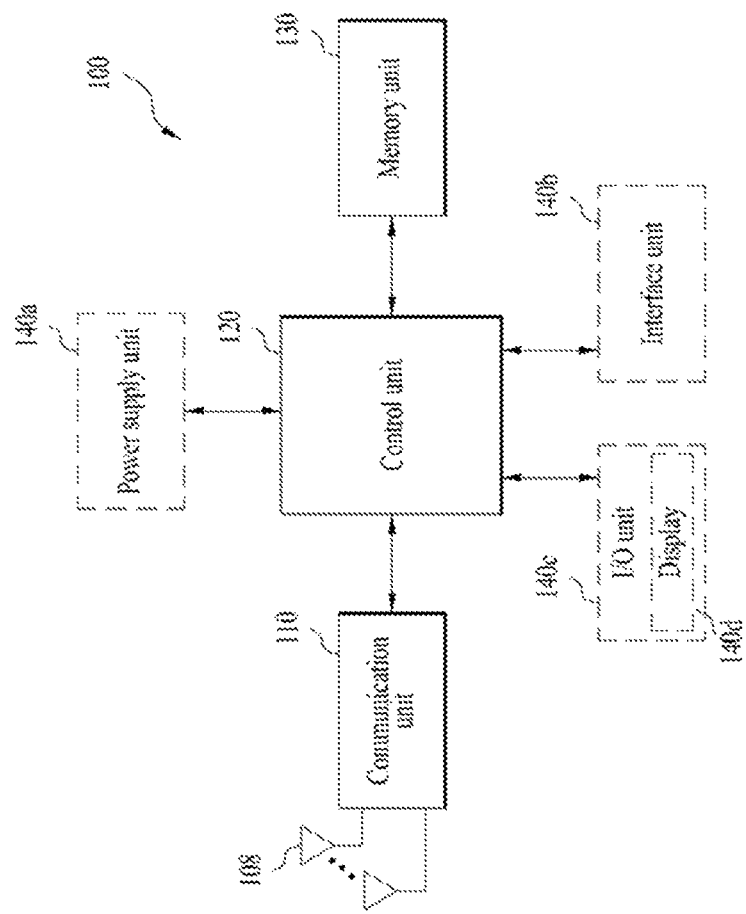

FIG. 14 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 14, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 13, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 15:
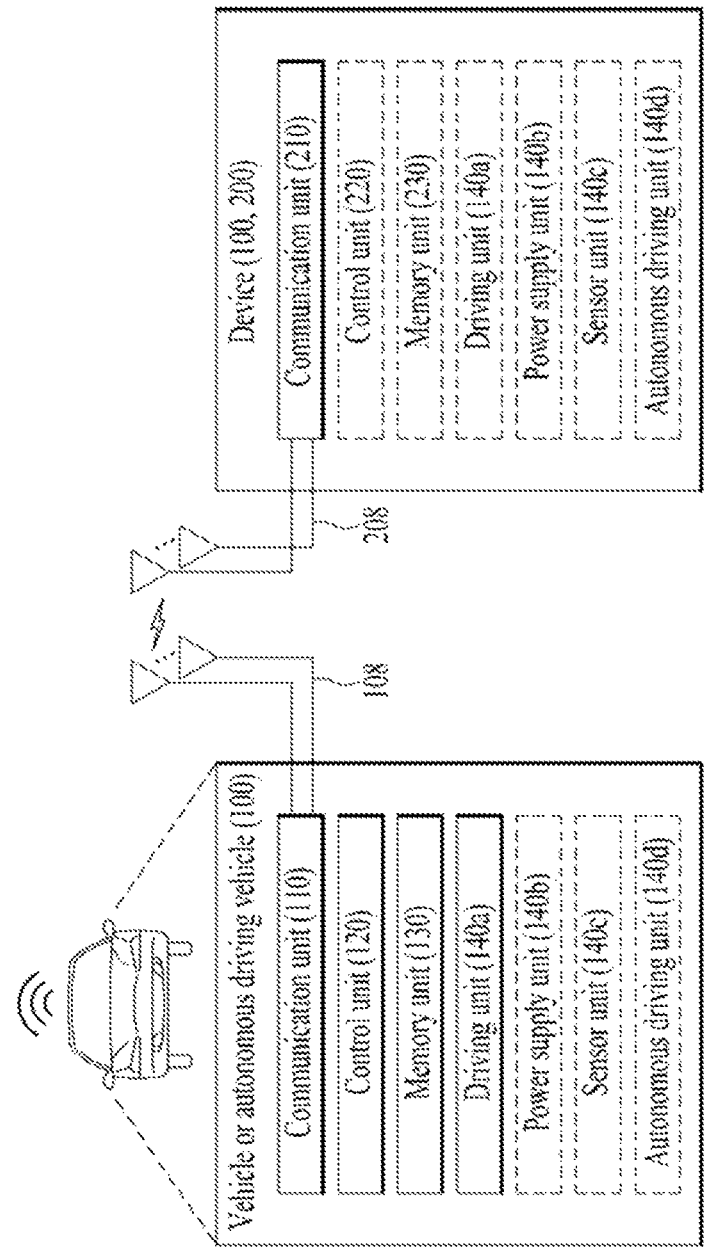

Examples of a Vehicle or an Autonomous Driving Vehicle Applicable to the Present Disclosure FIG. 15 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 15, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 13, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 16:
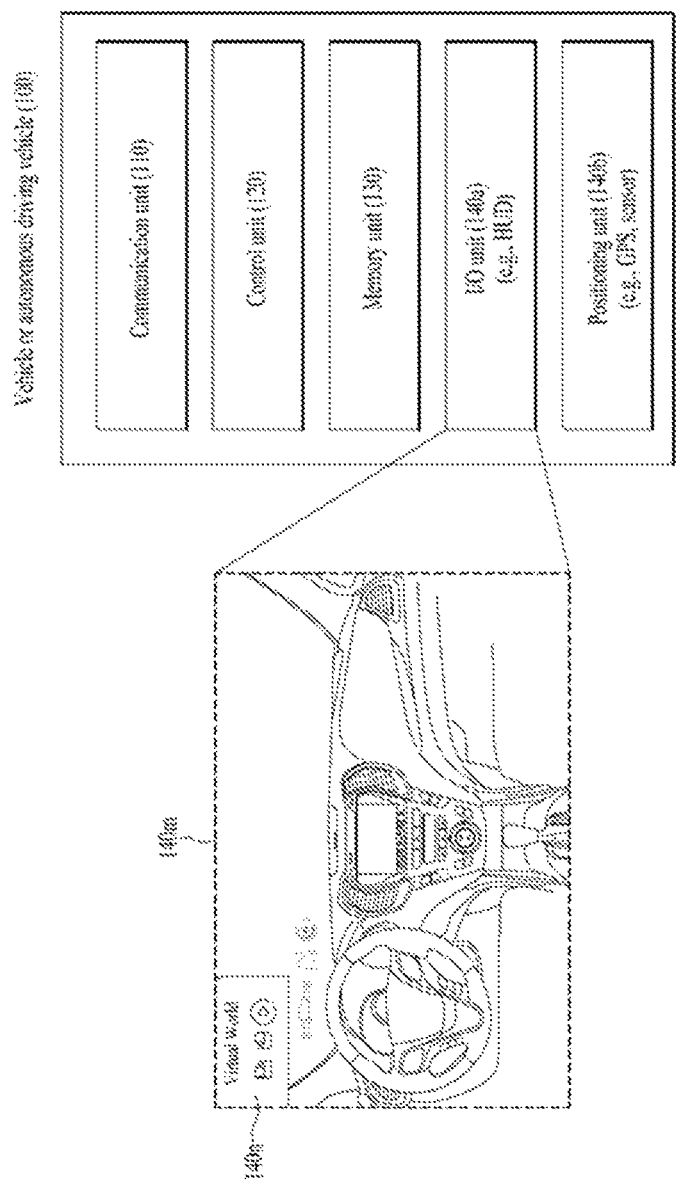

FIG. 16 illustrates a vehicle applied to the present disclosure. The vehicle may be implemented as a transport means, an aerial vehicle, a ship, etc.

Referring to FIG. 16, a vehicle 100 may include a communication unit 110, a control unit 120, a memory unit 130, an I/O unit 140*a*, and a positioning unit 140*b*. Herein, the blocks 110 to 130/140*a* and 140*b* correspond to blocks 110 to 130/140 of FIG. 13.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormality to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 17:
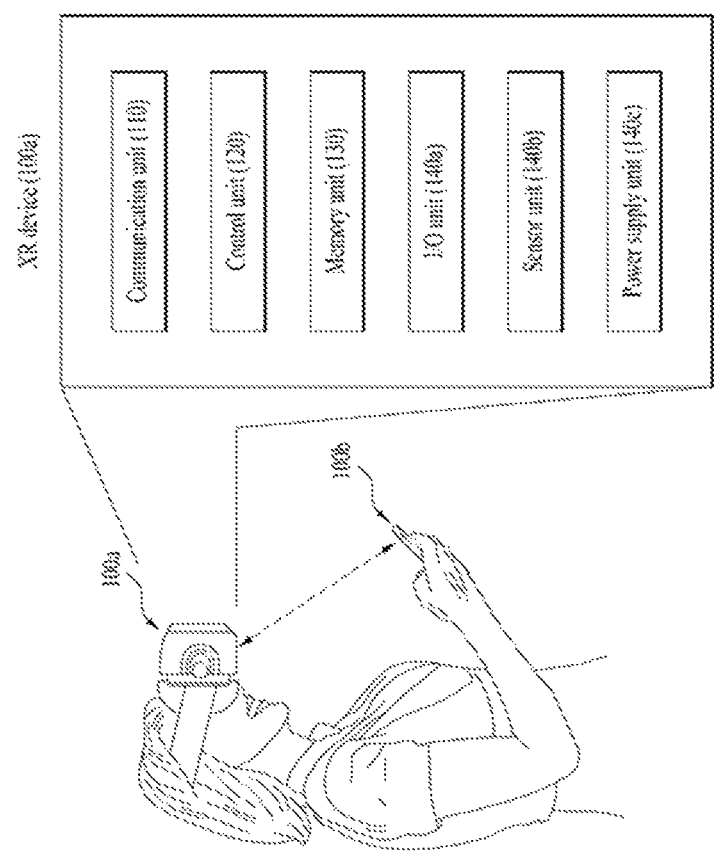

FIG. 17 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 17, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 13, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a handheld device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of a Robot Applicable to the Present Disclosure

Figure 18:
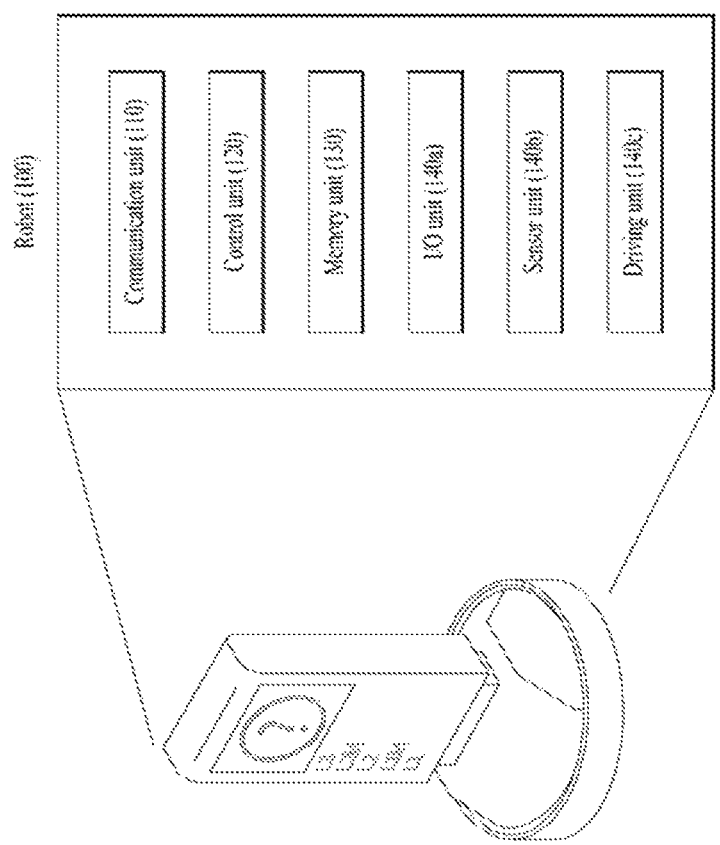

FIG. 18 illustrates a robot applied to the present disclosure. The robot may be categorized into an industrial robot, a medical robot, a household robot, a military robot, etc., according to a used purpose or field.

Referring to FIG. 18, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 13, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Examples of an AI Device Applicable to the Present Disclosure

Figure 19:
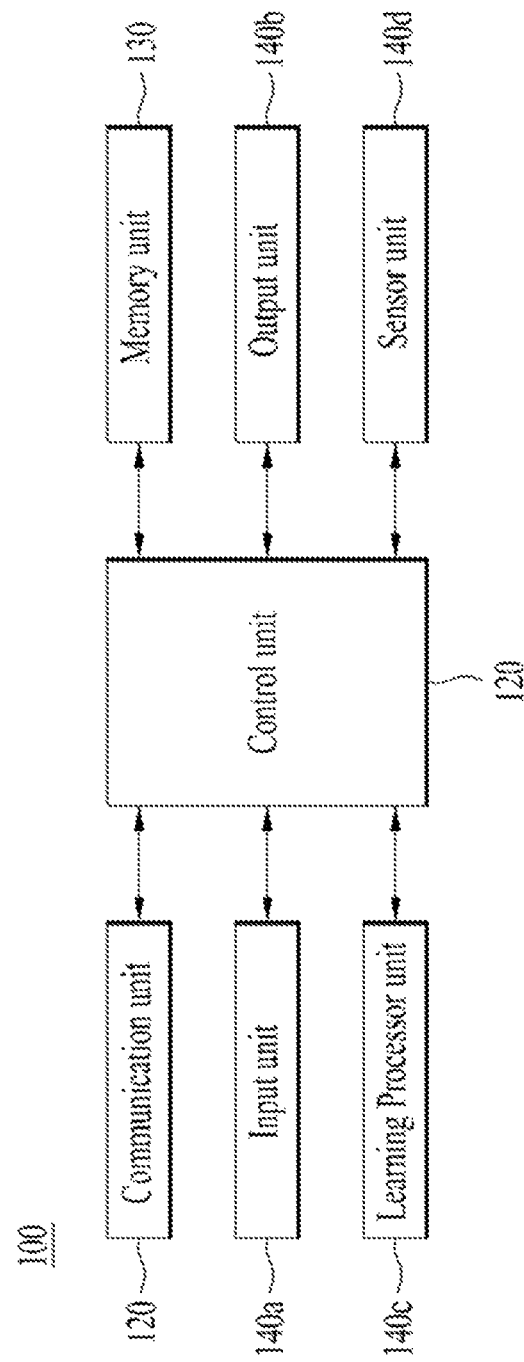

FIG. 19 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 19, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 13, respectively.

The communication unit 110 may transmit and receive wired/radio signals (e.g., sensor information, user input, learning models, or control signals) to and from external devices such as other AI devices (e.g., 100x, 200, or 400 of FIG. 10) or an AI server (e.g., 400 of FIG. 10) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 10). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 46). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL AVAILABILITY

The above-described embodiments of the present disclosure are applicable to various mobile communication systems.

The invention claimed is:

1. A method of performing an operation for a first user equipment (UE) in a wireless communication system, the method comprising:
    monitoring a physical sidelink control channel (PSCCH) including first sidelink control information (SCI) in an on-duration section;
    based on that at least one sidelink traffic indication about that there is sidelink data to be transmitted from a second UE is received, monitoring a physical sidelink shared channel (PSSCH) including second SCI; and
    based on that the at least one sidelink traffic indication about that there is the sidelink data to be transmitted from the second UE is not received, skipping monitoring of the PSSCH including the second SCI.

2. The method of claim 1, wherein whether the second SCI is for the first UE based on the second SCI is determined.

3. The method of claim 1, wherein, based on that a source L1 identifier included in the second SCI is the same as a unicast destination L1 identifier of the first UE or a destination L1 identifier included in the second SCI is the same as a unicast source L1 identifier of the first UE, the second SCI is determined to be for the first UE.

4. The method of claim 1, wherein, based on that a groupcast/broadcast destination L1 identifier included in the second SCI is the same as a groupcast/broadcast destination L1 identifier of the first UE, the second SCI is determined to be for the first UE.

5. The method of claim 1, wherein the sidelink traffic indication about that there is the sidelink data to be transmitted from the second UE is not received, and based on that there is no sidelink data to be transmitted to the second UE, the first UE operates in a sleep mode before the on-duration section ends.

6. The method of claim 1, wherein, based on the first SCI and the second SCI, a PSSCH including the sidelink data is received.

7. The method of claim 1, wherein a sidelink discontinuous reception (DRX) on-duration timer is operated in the on-duration section.

8. A first user equipment (UE) in a wireless communication system, comprising:

at least one processor; and at least one computer memory operatively connected to the at least one processor and configured to store commands that when executed causes the at least one processor to perform operations, wherein the operations include:

monitoring a physical sidelink control channel (PSCCH) including first sidelink control information (SCI) in an on-duration section;

based on that at least one sidelink traffic indication about that there is sidelink data to be transmitted from a second UE is received, monitoring a physical sidelink shared channel (PSSCH) including second SCI; and based on that the at least one sidelink traffic indication about that there is the sidelink data to be transmitted from the second UE is not received, skipping monitoring of the PSSCH including the second SCI.

9. The first user equipment (UE) of claim 8, wherein the first UE communicates with at least one of another UE, a UE related to an autonomous driving vehicle, or a base station (BS), or a network.

10. A processor for performing operations for a base station (BS) in a wireless communication system, the operations comprising:

monitoring a physical sidelink control channel (PSCCH) including first sidelink control information (SCI) in an on-duration section;

based on that at least one sidelink traffic indication about that there is sidelink data to be transmitted from a second UE is received, monitoring a physical sidelink shared channel (PSSCH) including second SCI; and based on that the at least one sidelink traffic indication about that there is the sidelink data to be transmitted from the second UE is not received, skipping monitoring of the PSSCH including the second SCI.

11. A computer readable storage medium storing at least one computer program that includes a command that, when executed by at least one processor, causes the at least one processor to perform operations for a first user equipment (UE), the operations comprising:

monitoring a physical sidelink control channel (PSCCH) including first sidelink control information (SCI) in an on-duration section;

based on that at least one sidelink traffic indication about that there is sidelink data to be transmitted from a second UE is received, monitoring a physical sidelink shared channel (PSSCH) including second SCI; and based on that the at least one sidelink traffic indication about that there is the sidelink data to be transmitted from the second UE is not received, skipping monitoring of the PSSCH including the second SCI.

* * * * *